United States Patent Office 3,046,136
Patented July 24, 1962

3,046,136
PHOTOSENSITIVE RESINOUS COMPOSITIONS
Franklin F. Ogden, Wilmington, Del., assignor to Monsanto Chemical Company, St. Louis, Mo., a corporation of Delaware
No Drawing. Filed Dec. 22, 1955, Ser. No. 554,633
12 Claims. (Cl. 96—114)

This invention relates to photosensitive resinous compositions and more particularly to photosensitive polyvinyl halide compositions.

Photosensitive polyvinyl halide compositions are a recent development. Image development in such compositions is based upon the dehydrohalogenation of the halogenated resin to form chromophore groups. While the photosensitive resinous films of the prior art have many present and potential utilities, much wider application would be made possible if exposure time to produce the image could be significantly shortened. In other words, an increased photosensitivity of such films is highly desirable.

It is an object of this invention to provide novel photosensitive polyvinyl halide compositions.

It is a further object of this invention to provide novel photosensitive polyvinyl halide compositions characterized by a degree of photosensitivity significantly greater than heretofore obtainable.

Additional objects will become apparent from the description of the invention.

Heretofore the photosensitive polyvinyl halide compositions comprised a vinyl halide polymer capable of dehydrohalogenation with the formation of at least five conjugated double bonds per molecule, a minor amount of a metal hydrogen halide sequestering agent, which agent in the presence of actinic light is raised to such an energy level so as to be capable of catalyzing the removal by chain reaction of at least five hydrogen halide from said resin, and which agent in the absence of actinic light and in the presence of heat is capable of reaching an energy level only high enough to remove less than five hydrogen halide from said resin and a minor amount of a compound which at the temperature necessary in the absence of light to cause dehydrohalogenation of said resin will make available organic groups to satisfy the double bonds formed by such heat-caused dehydrohalogenation.

It has now been discovered that the photosensitivity of such compositions as described above can be significantly increased if there is incorporated therewith a minor amount of a vinyl chloride telomer having the formula

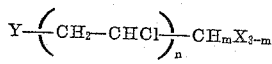

wherein Y is hydrogen or halogen, X is halogen, $n$ is an integer from 2 to 50 and $m$ may vary from 0 to 2.

The following examples illustrate the invention:

EXAMPLE I

A composition comprising 50 g. of vinyl chloride-vinylidene chloride copolymer resin, 25 g. solvent, 12 g. dioctyl phthalate, 3 g. dibutyl tin dilaurate and 1 g. silver naphthenate is thoroughly mixed, poured onto a plate and a 4 mil film drawn down. The film is cured at about 350° F. for about one minute. The film is then masked with a negative and exposed to actinic light for about 10 minutes. An immediate image is formed which is fixed at 350° F. for about 15 minutes.

EXAMPLE II

The procedure set forth in Example I is repeated using in place of the 50 g. of vinyl chloride-vinylidene chloride copolymer resin, a resin mixture containing 45 g. vinyl chloride-vinylidene chloride copolymer resin and 5 g. of a telomer of vinyl chloride and carbon tetrachloride having a molecular weight of approximately 2100. The film is masked with the same negative as in Example I, but significantly less exposure time is required to produce an image of the same intensity.

The procedure described in Example II is repeated using in place of the 45 g. of vinyl chloride-vinylidene chloride copolymer resin, 45 g. of polyvinyl chloride, 45 g. of polyvinylidene chloride and 45 g. of vinyl chloride-vinyl acetate copolymer. Results comparable to those obtained in Example II are obtained when each of the above mentioned resins are used in conjunction with the vinyl chloride telomer.

EXAMPLE III

A film is prepared from the following ingredients:

47 g. vinyl chloride-vinylidene chloride resin
3 g. vinyl chloride-dichloromethane telomer having a degree of polymerization of about 20
30 g. solvent
21 g. di-2-ethylhexyl phthalate
3 g. dibutyl tin diluarate
2 g. silver cumate peptized with naphthenic acid.

On exposure to actinic light results comparable to those obtained in Example II are realized.

EXAMPLE IV

A film is prepared from the following ingredients:

45 g. polyvinyl chloride
5 g. vinyl chloride-carbon tetrachloride telomer having a degree of polymerization of approximately 10
30 g. solvent
21 g. di-2-ethylhexyl phthalate
4 g. silver octoate peptized with octoic acid
3 g. dibutyl tin dilaurate On exposure to actinic light through a negative, results comparable to those obtained in Example II are obtained.

The compositions set forth in the preceding examples can be varied substantially without departing from the scope of this invention. The metal hydrogen halide sequestering agent used can be any organic or inorganic compound which in the presence of actinic light is raised to such an energy level so as to be capable of catalyzing the removal by chain reaction of at least five hydrogen halide from the resin and which agent in the absence of actinic light and in the presence of heat is capable of reaching an energy level only high enough to remove less than five hydrogen halide from the resin. Agents which can be used for this purpose include silver carbonate, silver oxide, and silver phosphate. The silver compounds of organic acids, phenols and mercaptans are particularly useful. These compounds include silver naphthenate, silver acetate, silver stearate, silver cumate, silver octoate and silver salt of 2-hydroxy-1,4-naphthoquinone. The sequestering agent can be used over a wide range of concentration. Those concentrations wherein the ratio of silver to resin reaches from 1:500 to 1:50 are particularly preferred.

A wide variety of compounds are available for use in stabilizing the compositions, that is, making available organic groups to satisfy the double bonds formed by the heat-caused dehydrohalogenation encountered during the fixing operation. Compounds which can be used for this purpose include dibutyl tin dilaurate, dibutyl tin dinaphthenate, dibutyl tin oxide, dibutyl tin maleate, dibutyl tin diacetate, dibutyl tin alkyl phosphate, dibutyl tin dinaphthenate, tetrabutyl tin, triphenyl phosphite, phenol, lead tartrate, tributyl borate, ethyl silicate, thiodipropionitrile, triphenyl borate, monopropyl maleate, dibutyl maleate, ethyl methacrylate, lauryl methacrylate, and crotonic acid. The stabilizer concentration may vary from a stabilizer-resin ratio of 1:500 to 1:50.

A wide variety of plasticizers may be used in these compositions in order to impart the desired degree of flexibility. Plasticizers which can be used in this application include di-2-ethylhexyl phthalate, tricresyl phosphate, tributyl Cellosolve phosphate, triethylene glycol di-2-ethylhexoate and di-2-ethylhexyl adipate. Plasticizer concentration can vary from about 0 to about 70 parts by weight per 50 parts by weight of resins, depending upon the film characteristics desired.

The photosensitive compositions of this invention can be compounded by any convenient method well known to those skilled in the art of compounding synthetic resinous compositions. Films may be solvent cast, or they may be formulated directly on a differential roll mill and then calendered to the desired thickness. The conventional plastisol technique is also useful in preparing the novel compositions of this invention.

To create an image on the photosensitive resinous compositions of this invention, the compositions may be exposed under any source of actinic light. While obvious factors will determine the amount of exposure necessary to form an image, with the proper actinic light source exposure of as little as 10 seconds are necessary to produce an image of low optical density. The fixing operation can be carried out over a wide temperature range. Generally temperatures in the range of from 250° F. to 450° F. applied over a period of from 1 to 30 minutes are suitable.

The vinyl chloride telomers used in this invention are represented by the formula

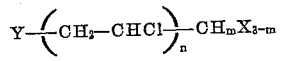

wherein Y is hydrogen or halogen, X is halogen, $n$ is an integer from 2 to 50 and $m$ may vary from 0 to 2. Vinyl chloride-carbon tetrachloride telomers having the following formula:

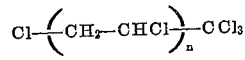

wheren $n$ can vary from 2 to 50, are particularly preferred. These materials can be obtained by reacting vinyl chloride with a halomethane in the presence of a free radical type catalyst. The following example illustrates a method of preparing these materials.

EXAMPLE V

Glass containers were charged with the quantities of carbon tetrachloride and benzoyl peroxide catalyst indicated in Table I and liquid vinyl chloride in the tabulated amounts was then poured into each. The containers were sealed and placed in a tumbling water bath maintained at 80° C. for approximately four hours. In no case was there any pressure remaining in any of the containers, demonstrating that all the vinyl chloride had reacted in each case. At the end of the reaction period the containers were opened and excess carbon tetrachloride was removed by distillation at 65° C. and at a pressure of 20 mm. Hg absolute. The specific viscosity of each of the polymers formed was then determined by dissolving 0.4000±0.0002 g. in 40 ml. of methyl ethyl ketone and passing said solution at 30.02±0.02° C. through a No. 50 Ostwald viscosimeter. Using specific viscosity as a relative measure of the molecular weight, molecular weights for the polymers were calculated. Resulting data are also recorded in Table I.

*Table I.—Vinyl Chloride Telomers*

| Run No. | 1 | 2 | 3 | 4 | 5 | 6 |
| --- | --- | --- | --- | --- | --- | --- |
| Carbon tetrachloride: | | | | | | |
| Weight, g. | 135.84 | 146.10 | 149.59 | 177.78 | 199.70 | 200.80 |
| Moles | 0.883 | 0.950 | 0.973 | 1.156 | 1.298 | 1.310 |
| Vinyl chloride (VCM): | | | | | | |
| Weight, g. | 44.16 | 33.22 | 30.41 | 22.22 | 20.30 | 19.20 |
| Moles | 0.707 | 0.532 | 0.487 | 0.355 | 0.321 | 0.310 |
| Catalyst, g.[1] | 1.1040 | 0.8475 | 0.7603 | 0.5555 | 0.5075 | 0.4800 |
| Mole Ratio, CCl₄/VCM | 1.25/1 | 1.78/1 | 2.00/1 | 3.25/1 | 4.0/1 | 4.22/1 |
| Telomer Recovered, g. | 49.0 | 39.7 | 36.7 | 25.1 | 23.8 | 22.7 |
| Specific Viscosity | 0.0520 | 0.0649 | 0.0580 | 0.0410 | 0.0378 | 0.0347 |
| Molecular Weight | 2,100 | 1,570 | 1,370 | 890 | 810 | 730 |
| Appearance | [2] | [2] | [2] | [3] | [3] | [3] |

[1] Approximately 2.5% by weight of vinyl chloride.
[2] White powder.
[3] Highly viscous paste.

The concentration of the telomers used in the novel photosensitive resinous compositions of this invention is subject to substantial variation. Preferably from about 1 part by weight to about 10 parts by weight of the telomer per 100 parts by weight of the vinyl halide polymer is used. Generally only minor amounts of the telomer are used, but higher amounts, for example as high as 25 parts by weight of the telomer per 100 parts by weight of the vinyl halide resins, can be used if desired.

1. A resinous composition comprising a vinyl halide polymer, a minor amount of a vinyl chloride telomer having the formula

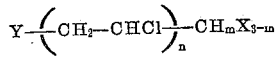

wherein Y is selected from the group consisting of hydrogen and halogen, X is halogen, $n$ is an integer from 2 to 50 and $m$ is a number from 0 to 2, a metal hydrogen-halide sequestering agent which agent in the presence of actinic light is raised to such an energy level so as to be capable of catalyzing the removal by chain reaction of at least five hydrogen halides from said vinyl halide polymer and a stabilizer for said resinous composition.

2. A resinous composition as described in claim 1 wherein the vinyl chloride telomer has the formula

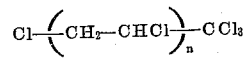

wherein $n$ is an integer from 2 to 50.

3. A resinous composition as described in claim 2 wherein the vinyl halide polymer is a vinyl chloride-vinylidene chloride copolymer.

4. A resinous composition as described in claim 2 wherein the vinyl halide polymer is polyvinyl chloride.

5. A resinous composition comprising a vinyl halide polymer capable of dehydrohalogenation with the formation of at least 5 conjugated double bonds per molecule, a minor amount of a vinyl chloride telomer having the formula

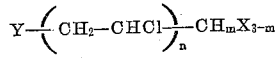

wherein Y is selected from the group consisting of hydrogen and halogen, X is halogen, $n$ is an integer from 2 to 50 and $m$ is a number from 0 to 2, a metal hydrogen halide sequestering agent selected from the class consisting of silver carbonate, silver oxide, silver phosphate, silver naphthenate, silver acetate, silver cumate, silver octoate, silver compounds of phenols, silver compounds of mercaptans and the silver salt of 2-hydroxy-1,4-naphthoquinone and a stabilizer selected from the group consisting of dibutyl tin maleate, dibutyl tin diacetate, dibutyl tin alkyl phosphate, dibutyl tin dinaphthenate, tetrabutyl tin, triphenyl phosphite, phenol, lead tartrate, tributyl borate, ethyl silicate, thiodipropionitrile, triphenyl borate, monopropyl maleate, dibutyl maleate, ethyl methacrylate, lauryl methacrylate, and crotonic acid.

6. A resinous composition as described in claim 5 wherein the vinyl chloride telomer has the formula

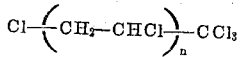

wherein $n$ is an integer from 2 to 50.

7. A resinous composition as described in claim 6 wherein the vinyl halide polymer is a vinyl chloride-vinylidene chloride copolymer.

8. A resinous composition as described in claim 6 wherein the vinyl halide polymer is polyvinyl chloride.

9. A resinous composition comprising a vinyl halide polymer capable of dehydrohalogenation with the formation of at least 5 conjugated double bonds per molecule, a minor amount of a vinyl chloride telomer having the formula

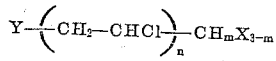

wherein Y is selected from the group consisting of hydrogen and halogen, X is halogen, $n$ is an integer from 2 to 50 and $m$ is a number from 0 to 2, a metal hydrogen halide sequestering agent, which agent in the presence of actinic light is raised to such an energy level so as to be capable of catalyzing the removal by chain reaction of at least 5 hydrogen halide from said vinyl halide polymer, and which agent in the absence of actinic light and in the presence of heat is capable of reaching an energy level only high enough to remove less than 5 hydrogen halide from said resin, and a stabilizer for said vinyl halide polymer which at the temperature necessary, in the absence of light, to cause dehydrohalogenation of said vinyl halide polymer will make available organic groups to satisfy the double bonds formed by such heat-caused dehydrohalogenation.

10. A resinous composition as described in claim 9 wherein the vinyl chloride telomer has the formula

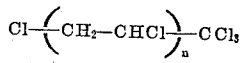

wherein $n$ is an integer from 2 to 50.

11. A resinous compositoin as described in claim 10 wherein the vinyl halide polymer is a vinyl chloride-vinylidene chloride copolymer.

12. A resinous composition as described in claim 10 wherein the vinyl halide polymer is polyvinyl chloride.

References Cited in the file of this patent

UNITED STATES PATENTS

| | | |
|---|---|---|
| 1,587,274 | Beebe et al. | June 1, 1926 |
| 2,099,297 | Clement | Nov. 16, 1937 |
| 2,395,292 | Peterson | Feb. 6, 1946 |
| 2,402,137 | Hanford et al. | June 18, 1946 |
| 2,432,287 | Cramer | Dec. 9, 1947 |
| 2,433,015 | Roland et al. | Dec. 23, 1947 |
| 2,440,800 | Hanford | May 4, 1948 |
| 2,468,208 | Khrasch | Apr. 26, 1949 |
| 2,478,390 | Hanford et al. | Aug. 9, 1949 |
| 2,402,137 | Feasley et al. | May 8, 1951 |
| 2,551,639 | Feasley et al. | May 8, 1951 |
| 2,584,306 | Theobald | May 8, 1951 |
| 2,712,996 | Elliot | July 12, 1955 |
| 2,789,052 | Elliott | Apr. 16, 1957 |

FOREIGN PATENTS

| | | |
|---|---|---|
| 649,555 | Great Britain | Jan. 31, 1951 |

OTHER REFERENCES

Schildknecht: "Polymer Process—High Polymers," vol. X, Interscience Publishers, Inc., N.Y., pages 177–180 (1956).